Jan. 1, 1929.
F. OUTREY
1,696,968
AUTOMATIC OPTICAL PROJECTION APPARATUS
Original Filed July 16, 1921
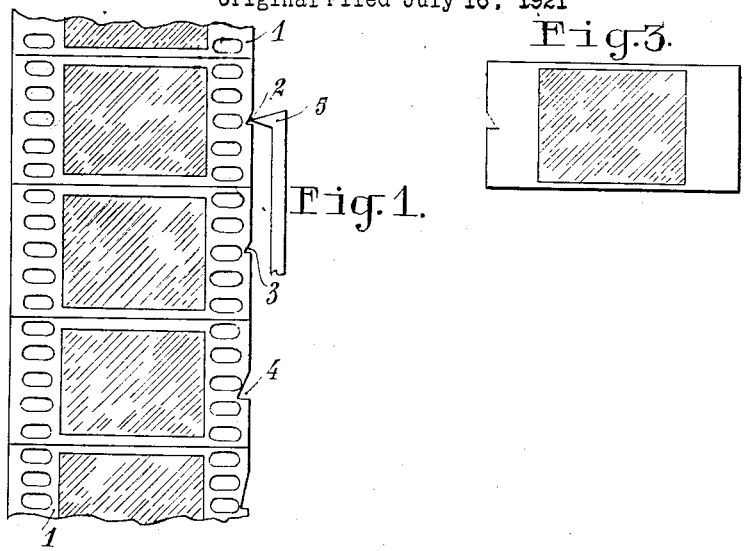
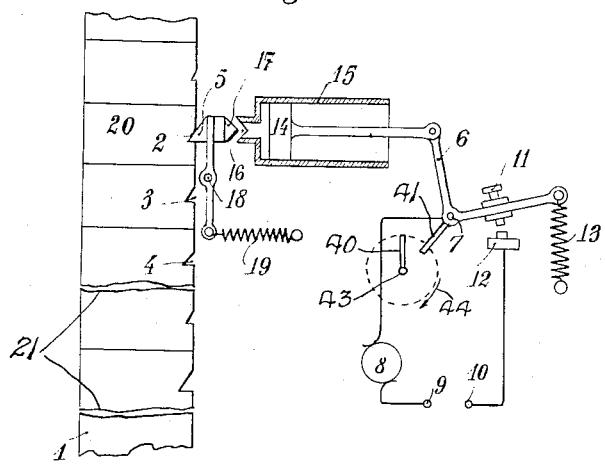
Inventor.
Fernand Outrey Patented Jan. 1, 1929.

1,696,968

UNITED STATES PATENT OFFICE.

FERNAND OUTREY, OF PARIS, FRANCE, ASSIGNOR TO PATHÉ-CINÉMA, ANCIENS ETABLISSEMENTS PATHÉ FRÈRES, OF PARIS, FRANCE, A JOINT-STOCK COMPANY OF FRANCE.

AUTOMATIC OPTICAL PROJECTION APPARATUS.

Application filed July 16, 1921, Serial No. 485,229, and in France July 20, 1920. Renewed November 30, 1927.

My invention has for its object to effect demonstrations, impart information or to obtain publicity by means of automatic optical projection apparatus with a minimum of material and without danger.

Hitherto for this purpose stationary optical projections or kinematographic projections have been employed, either alternately or simultaneously.

To impart information, projection is effected at all speeds suitable for the desired demonstration, varying from a stop of several minutes' duration to the greatest possible speed of projection.

The apparatus forming the subject of my invention more particularly aims at obtaining all the previously obtained effects of variable speed of projection, without the assistance of an operator and simply by the introduction of the film or the slides which themselves carry the means for controlling their speed of travel.

For advertising purposes, the reproduction of a movement may be very slow in order that the demonstration may be thoroughly appreciated. It is not always necessary to obtain the usual speed of projection in cinemas in which the regular spectator will admit no defect.

Some preparatory scene may need to be on view but for a very short time, whereas another, accompanied by long sentences or complicated designs requires to be visible for a longer period.

That which the cinematograph effects by employing more or less length of film according to the particular subject or the length of the titles or inscriptions to be read, the apparatus hereinafter described effects by obtaining, by means to be described, a longer or shorter period of exposure, variable with each scene and determined by the film or slide itself.

Consequently a demonstration or the like could be condensed into a restricted number of pictures which could be arranged to pass before view for an exactly determined period in order to enable one to follow for example a teacher, a piece of music, a phonograph record, an accompaniment, the picture or the gesture being interposed at precisely the desired moment, without the apparatus being limited to one or more speeds and consequently producing the most artistic and unexpected effects.

The resulting advantage to the advertiser, the commercial traveller and the teacher is obvious, who have no longer to trouble about anything, other than to start, slow down or accelerate, if necessary, the apparatus.

My invention is shown, by way of example, on the accompanying drawing, in which:—

Fig. 1 shows a portion of a film used in my apparatus.

Fig. 2 is a diagrammatic view of the entire contrivance for regulating the speed of the film.

Fig. 3 shows a separate slide formed with a notch like the film of the arrangement shown in Fig. 2.

A film 1, shown in Fig. 1, is formed at the side between two of its perforations, with a notch 2, more or less deep in which engages at the instant of the appearance of the image, a member 5 of suitable shape which controls the period of projection.

If there is no notch, the film travels at the maximum speed; if a notch of a given depth is provided in the film opposite the section, the period of rest will be dependent upon the depth of the notch; each section of the film is thus provided with a notch 2, 3, 4, etc. of varying depth according to the duration of the period during which the section is to be projected.

If the nature of the film does not permit cutting sufficiently large notches, the result may be obtained by means of several notches disposed either on one or the other or on both sides of the film.

The controlling member may act like the lever which controls the striking mechanism of a clock, or like, the air escape valve of a regulating piston, or may consist in an electric resistance into the feed circuit of a motor, or may be any kind of mechanical or electrical contrivance.

A controlling device is shown, by way of example, in Fig. 2, suitable in the case where the mechanism which displaces the film is driven by an electromoter. This device especially consists of a bell crank lever 6 mounted on a spindle 7 adapted to be rocked mechanically by the electromotor 8 through the agency of any suitable mechanical connection, such as the arm 41 on the spindle 7, this arm 41 being encountered by an arm 40 secured to the shaft 43, the latter being rotated by the motor 8. The lever 6 is included in the circuit of the electromotor 8 provided with the two electric supply terminals 9 and 10; the lever 6 is permanently included in the circuit and one of its arms carries a contact 11, which, in cooperation with a contact 12 can open or close the electric circuit. A returning spring 13 tends constantly to close the two contacts 11 and 12. One arm of the lever 6 is connected to the rod of a piston 14 moving in a cylinder 15 one end of which is entirely open to the atmosphere while the other communicates therewith by a passage 16.

A lever 5 angularly displaceable about an axis 18 and connected at one of its ends to a tension spring 19 engages by a nose of suitable shape the notches in the film 1 and controls by a point 17 the extent of opening of the air passage 16.

This device operates as follows:—The electromoter 8 displacing the film by a suitable mechanism, brings say the section 20 provided with the notch 2, opposite the projection apparatus; the nose of the lever 5, under the influence of the spring 19, enters the notch 2; the point 17 of the lever 5 opening widely the mouth of the air passage 16. The electromotor mechanically acting on the bell crank lever 6 through the engagement of the arm 40 with the arm 41 rocks the same about its spindle 7, in such a manner that the piston 14 is moved to the end of its stroke in the cylinder 15, while the contact 11 is moved away from the contact 12 opening the circuit of the electromotor and stopping the operation of the electromotor.

Now, the several parts occupy the positions shown in Fig. 2; the electromotor is stopped, the film is at rest and an image is projected by the projector.

The electromotor ceasing to act on the lever 6, the latter is subjected only to the action of the spring 13 which tends to bring the two contacts 11 and 12 together again. The piston, under the influence of the spring 13 is drawn towards the right in Fig. 2 and air is thus drawn in by the piston through the orifice 16.

The speed at which the parts are returned to their original positions depends therefore on the rapidity with which the air can enter by the orifice 16 into the cylinder 15, and consequently on the position of the point 17 and on the depth of the notch 2. The deeper the notch 2 the greater is the extent of opening of the air inlet, and the more rapid the return of the parts of the contrivance to their initial positions.

When the contact 11 comes into engagement with the contact 12, the circuit of the electromotor is closed, the film is displaced the amount of a section and the same cycle of operations, described above, takes place. It will be understood that the film 1 is run continuously as in the usual projecting apparatus and that the film is not stopped at every picture. Accordingly, not every picture is provided with a notch but only an occasional picture or a "title" where it is desired to stop the picture or title long enough to hold the same at rest without using an unnecessary length of film. Broken lines 21, shown in Fig. 2, indicate that pictures having notches are or may be separated from each other by sections of pictures.

The slide shown in Fig. 3 is formed on its side with a notch like that shown in Fig. 1, and cooperates with a suitable contrivance, for instance that shown in Fig. 2.

I claim as my invention:

1. In combination with the projecting device of an optical projecting apparatus, of movable pictures arranged to pass in front thereof, means for moving said pictures including an electric motor in an electric circuit, a movable member for opening and closing said circuit to render operative and inoperative said picture moving means, a controlling member associated with said movable member, said picture having means engaged by said controlling member and co-operating therewith for automatically controlling the length of time said picture moving means is inoperative, and means for moving said movable member to render said picture moving means operative after a predetermined time.

2. In combination with the projecting device of an optical projecting apparatus, of movable pictures arranged to pass in front thereof, means for moving said pictures including an electric motor in an electric circuit, a movable member for opening and closing said circuit to render operative and inoperative said picture moving means, a controlling member associated with said movable member, said picture having notches engaged by said controlling member and co-operating therewith for automatically controlling the length of time said picture moving means is inoperative, and means for moving said movable member to render said picture moving means operative after a predetermined time.

3. In a projection apparatus the combination with the projecting means, of movable pictures adapted to pass in front thereof, means for moving said pictures, a movable member for controlling the said picture moving means and adapted to engage in notches provided in the edges of said pictures, a cylinder open at one end and having an air-inlet at the other end in co-operation with the said movable member, a piston in said cylinder, connecting means between the said piston and the said picture moving means, the said piston on being moved by the latter to the end of its inward stroke throwing the said picture moving means out of operation while when returned to its initial position by the inrush of air into the said cylinder as controlled by the said movable member throwing the said picture moving means back in operation.

4. The combination as set forth in claim 3, comprising also a spring acting upon the said movable member for moving the same in automatic engagement with the notches in the pictures, the said connecting means between the said piston and the said picture moving means comprising a bell-crank lever and a spring tending to move the said lever into a position to throw the said picture moving means into operation.

In testimony whereof I hereunto affix my signature.

FERNAND OUTREY.